(12) United States Patent
Lian

(10) Patent No.: US 9,998,022 B2
(45) Date of Patent: Jun. 12, 2018

(54) CURRENT LIMIT PEAK REGULATION CIRCUIT FOR POWER CONVERTER WITH LOW STANDBY POWER DISSIPATION

(71) Applicant: Chengdu Monolithic Power Systems Co., Ltd., Chengdu (CN)

(72) Inventor: Li Lian, Chengdu (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 0 days. days.

(21) Appl. No.: 15/632,225

(22) Filed: Jun. 23, 2017

(65) Prior Publication Data

US 2017/0373602 A1    Dec. 28, 2017

(30) Foreign Application Priority Data

Jun. 24, 2016 (CN) .......................... 2016 1 0477831

(51) Int. Cl.
*H02M 3/335* (2006.01)
*H02M 3/338* (2006.01)
*H02H 7/12* (2006.01)
*H02M 3/24* (2006.01)
*H02M 1/32* (2007.01)

(52) U.S. Cl.
CPC ........ *H02M 3/3387* (2013.01); *H02H 7/1213* (2013.01); *H02M 3/24* (2013.01); *H02M 3/338* (2013.01); *H02M 3/33523* (2013.01); *H02M 1/32* (2013.01)

(58) Field of Classification Search
CPC .......... H02M 1/32; H02M 3/24; H02M 3/335; H02M 3/33507; H02M 3/33523; H02M 3/338; H02M 7/04; H02M 7/1557; H02M 7/217
See application file for complete search history.

(56) References Cited

U.S. PATENT DOCUMENTS

| | | | | |
|---|---|---|---|---|
| 4,952,819 A * | 8/1990 | Herrmann | ................ | H02M 1/32 327/379 |
| 7,593,245 B2 * | 9/2009 | Djenguerian | ........... | H02M 1/32 363/21.12 |
| 9,142,947 B2 * | 9/2015 | Hosotani | .................. | H02H 3/08 |
| 2015/0280544 A1 * | 10/2015 | Wang | ...................... | H02M 1/32 323/285 |
| 2016/0204705 A1 * | 7/2016 | Matsuda | ................. | H02M 1/32 363/21.15 |

* cited by examiner

*Primary Examiner* — Matthew Nguyen
(74) *Attorney, Agent, or Firm* — Perkins Coie LLP

(57) ABSTRACT

A current limit peak regulation circuit, a current limit circuit and a power converter including the current limit peak regulation circuit. The current limit peak regulation circuit provides a current limit threshold to limit a maximum allowable peak current value of a current flowing through a main switch of the power converter and adjusts the current limit threshold to decrease with decrease in a switching frequency of the power converter when the power converter is in a constant voltage mode so as to reduce power dissipation of the power converter in standby mode.

17 Claims, 3 Drawing Sheets

US 9,998,022 B2

CURRENT LIMIT PEAK REGULATION CIRCUIT FOR POWER CONVERTER WITH LOW STANDBY POWER DISSIPATION

CROSS-REFERENCE TO RELATED APPLICATION(S)

This application claims the benefit of CN application No. 201610477831.7 filed on Jun. 24, 2016 and incorporated herein by reference.

TECHNICAL FIELD

This disclosure relates generally to power converters, and more particularly but not exclusively relates to current limit peak regulation circuit of switching power converters.

BACKGROUND

Flyback power converters are one of the most widely used types of power converters that are used for providing appropriate supply voltage or supply current in industry and consumer electronic devices. Flyback power converters generally adopt primary feedback control technique to reduce cost.

In most offline power applications, when entered into sleep mode, the switching frequency of a flyback converter should be decreased to be lower than 100 HZ to reduce power loss. However, only decreasing the switching frequency normally cannot meet the requirements of low standby (sleep mode) power dissipation and low noise for most offline flyback converters. Therefore, it is desired to further reduce the maximum current that is allowed to flow through a power switch in the primary side of a flyback converter to reduce the standby power dissipation and noise.

SUMMARY

In accomplishing the above and other objects, there has been provided, in accordance with an embodiment of the present invention, a current limit peak regulation circuit for a power converter. The current limit peak regulation circuit may have a first input terminal, a second input terminal and a third input terminal respectively configured to receive a frequency indication signal indicative of a switching frequency of the power converter, a first reference signal indicative of a first predetermined frequency, and a second reference signal indicative of a second predetermined frequency. The current limit peak regulation circuit is configured to generate a current limit threshold indicative of a maximum allowable peak current value of the current flowing through the main switch based on the frequency indication signal, the first reference signal and the second reference signal. The current limit peak regulation circuit is further configured to adjust the current limit threshold to decrease with decrease in the switching frequency in a constant voltage mode of the power converter.

There has also been provided, in accordance with an embodiment of the present invention, a current limit circuit for a power converter. The current limit circuit may include the current limit peak regulation circuit and a current limit comparator. The current limit comparator is configured to respectively receive the current limit threshold and a switch current feedback signal indicative of a current flowing through a main switch of the power converter, and to compare the switch current feedback signal with the current limit threshold to provide an off-control signal at an output terminal, wherein the off-control signal is configured to turn the main switch off when the switch current feedback signal reaches the current limit threshold.

There has also been provided, in accordance with an embodiment of the present invention, a control module for a power converter. The control module may include the current limit circuit and a constant voltage mode control circuit. The constant voltage mode control circuit is configured to operate an output voltage feedback signal indicative of an output voltage of the power converter with a reference signal indicative of a desired value of the output voltage to provide a difference signal indicative of a difference between the output voltage feedback signal and the reference signal, to compare the difference signal with a saw tooth signal to provide a constant voltage mode ON control signal to turn the main switch on when the saw tooth signal reaches the difference signal, and to receive the off-control signal to turn the main switch off.

There has also been provided, in accordance with an embodiment of the present invention, a power converter having an input port configured to receive an input voltage and an output port configured to provide an output voltage. The power converter comprises a control module configured to receive an output voltage feedback signal indicative of the output voltage and a switch current feedback signal indicative of a current flowing through the main switch, and to provide a driving signal to the switch module at least based on the output voltage feedback signal, the switch current feedback signal, a reference signal indicative of a desired value of the output voltage and a current limit threshold indicative of a maximum allowable peak current value of the current flowing through the main switch. The control module may comprise a current limit peak regulation circuit configured to generate the current limit threshold and to adjust the current limit threshold to decrease with decrease in the switching frequency in a constant voltage mode of the power converter.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
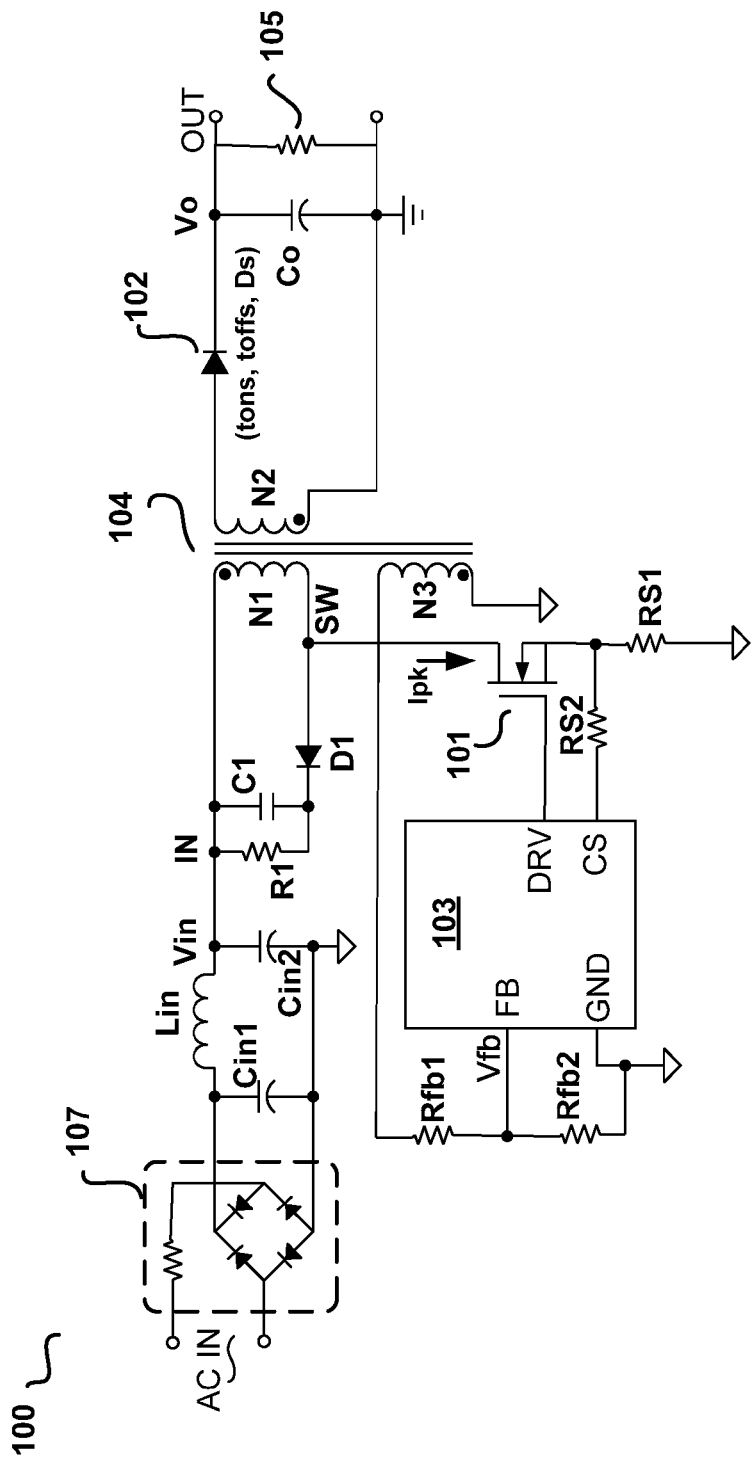
FIG. 1 illustrates a block diagram of a power converter 100 in accordance with an embodiment of the present invention.

FIG. 1 illustrates a block diagram of a power converter 100 in accordance with an embodiment of the present invention. The power converter 100 may comprise: an input port IN configured to receive an input voltage Vin; an output port OUT configured to provide an output voltage Vo to power a load 105; a switch module at least comprising a main switch (e.g. the main switch 101 illustrated in FIG. 1); and a control module 103. The switch module is configured to conduct on and off switching based on a driving signal DRV to convert the input voltage Vin into the output voltage Vo. The control module 103 may have a first control input terminal FB, a second control input terminal CS, a ground terminal GND and a first control output terminal DRV. The first control input terminal FB is configured to monitor/receive a first feedback signal (an output voltage feedback signal) Vfb indicative of the output voltage Vo, the second control input terminal CS is configured to monitor/receive a second feedback signal (a switch current feedback signal) VCS indicative of a current flowing through the main switch 101. The control module 103 is configured to provide the driving signal DRV to the switch module at least based on the first feedback signal Vfb, the second feedback signal VCS, a reference signal Vref and a current limit threshold VCS_LIM. The reference signal Vref may be indicative of a desired value of the output voltage Vo. The current limit threshold VCS_LIM may be indicative of a maximum allowable peak current value Ipk (which is referred to as current limit peak in the following) of the current flowing through the main switch 101. The reference signal Vref and the current limit threshold VCS_LIM may be respectively generated by corresponding internal circuits in the power converter 100.

In accordance with the exemplary embodiment of FIG. 1, the switch module of the power converter 100 may further comprise a second switch 102. The second switch 102 may be switched on and off in a complementary manner with the main switch 101, i.e. when the main switch 101 is switched on, the second switch 102 is switched off, and vice versa. The main switch 101 may comprise a controllable switching device, e.g. illustrated as a MOSFET in FIG. 1, having a first switch terminal SW, a second switch terminal and a switch control terminal. The second switch 102 may comprise a diode. In other embodiment, the second switch 102 may comprise a controllable switching device, also controlled by the driving signal DRV to conduct on and off switching in a complementary manner with the main switch 101.

In accordance with an embodiment of the present invention, the power converter 100 may further comprise an inductive power storage device 104, configured to be coupled to the input port IN to store energy when the main switch 101 is on and to be coupled to the output port OUT to supply energy to the load 105 when the main switch 101 is off. In the exemplary embodiment of FIG. 1, the inductive power storage device 104 is illustrated as to comprise a transformer having a first winding N1 and a second winding N2. The first winding N1 is a primary winding coupled between the input port IN and the first switch terminal SW of the main switch 101. The second winding N2 is a secondary winding coupled to the output port OUT through the second switch 102. The power converter 100 may further comprise a capacitive output filtering device Co coupled to the output port OUT to filter the output signal from the switch module (which can also be considered as to filter the output voltage Vo) to make the output voltage Vo smooth. The exemplary embodiment of the power converter 100 shown in FIG. 1 is configured based on flyback type converter topology and may be referred to as a flyback power converter. The input port IN of the flyback converter 100 receives an unregulated direct current ("DC") input voltage Vin, as shown in FIG. 1, the DC input voltage Vin may be provided by rectifying an alternating current ("AC") supply voltage AC IN through a rectifying bridge 107 and then filtering the output of the rectifying bridge 107 through a simple input filtering circuit (e.g. comprising an input inductor Lin, a first input capacitor Cin1 and a second input capacitor Cin2). Flyback converters such as that shown in FIG. 1 can fulfill AC-DC conversion and can provide isolation between the output voltage Vo and the input supply voltage AC IN. They are widely used in many applications. In accordance with an embodiment of the present invention, the inductive energy storage device 104 of the flyback power converter 100 may further have a third winding N3 as an auxiliary winding which is coupled to the first control input terminal FB through a feedback circuit. One of ordinary skill in the art should understand that the circuits and method taught herein may apply to other types of converters, such as boost (step-up) power converter, buck-boost power converter, buck power converter etc.

In accordance with an embodiment of the present invention, the power converter 100 may further comprise an input buffer coupled between the input port IN and the first switch terminal SW of the main switch 101 to provide inductive leakage current path. In the example of FIG. 1, the input buffer is illustrated to comprise a resistor R1, a capacitor C1 and a fast recovery diode D1. The resistor R1 and the capacitor C1 are coupled in parallel and then coupled to the diode D1 in series.

In accordance with an embodiment of the present invention, the feedback circuit may comprise a first feedback resistor Rfb1 and a second feedback resistor Rfb2 connected in series between the high voltage potential terminal of the third winding N3 and the reference ground GND. The first feedback signal Vfb is provided from the common connection of the first feedback resistor Rfb1 and the second feedback resistor Rfb2. In other embodiments, the feedback circuit may comprise other circuit elements that are appropriate for providing the first feedback signal Vfb.

Figure 2:
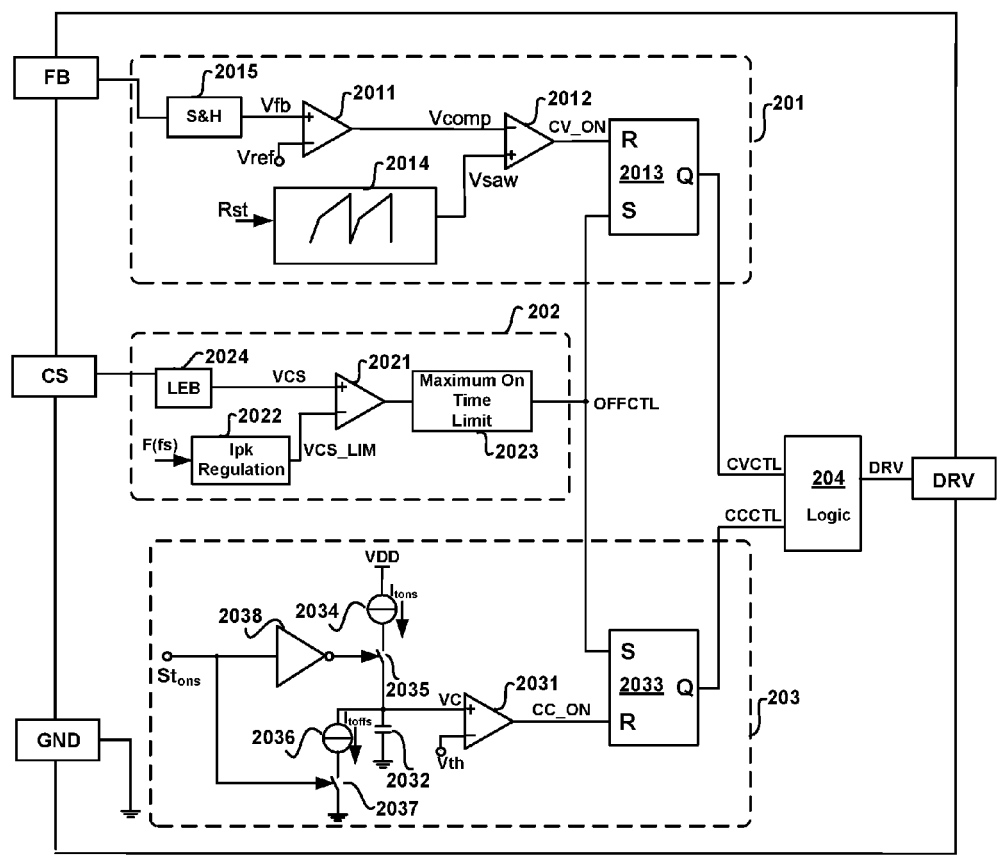
FIG. 2 illustrates a schematic diagram of a control module 103 of the power converter 100 in accordance with an embodiment of the present invention.

FIG. 2 illustrates a schematic diagram of a control module 103 of the power converter 100 in accordance with an embodiment of the present invention. The power converter 100 and the control module 103 will be described in more detail with reference to FIGS. 1-2 in the following.

In accordance with an embodiment of the present invention, the control module 103 may comprise a constant voltage mode control circuit 201. The constant voltage mode control circuit 201 is configured to operate the first feedback signal Vfb with the reference signal Vref to provide a difference signal Vcomp indicative of a difference between the first feedback signal Vfb and the reference signal Vref. The constant voltage mode control circuit 201 is further configured to compare the difference signal Vcomp with a saw tooth signal Vsaw to provide a constant voltage mode ON control signal CV_ON, wherein the constant voltage mode ON control signal CV_ON is configured to trigger the driving signal DRV to turn the main switch 101 on when the saw tooth signal Vsaw reaches the difference signal Vcomp. The constant voltage mode control circuit 201 is further configured to receive an off-control signal OFFCTL, wherein the off-control signal OFFCTL is configured to trigger the driving signal DRV to turn the main switch 101 off when the current flowing through the main switch 101 reaches the current limit peak Ipk. The second switch 102 is turned on and off in complementary with the main switch 101. In this manner, the constant voltage mode control circuit 201 can regulate the power converter 100 to operate in constant voltage mode wherein the output voltage Vo of the power converter 100 is maintained substantially constant through controlling the main switch 101 and the second switch 102 to switch on and off periodically. In the constant voltage mode, the switching frequency fs of the power converter 100 (i.e. the switching frequency of the switch module which is also the switching frequency of the main switch 101 and the second switch 102) can be determined by the difference signal Vcomp.

Figure 3:
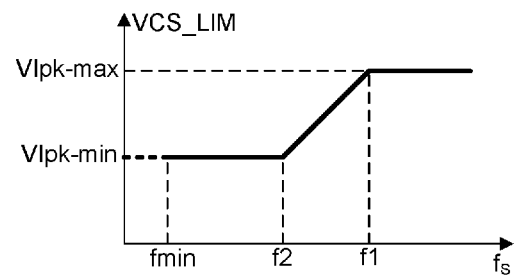
FIG. 3 illustrates a waveform diagram showing the current limit threshold VCS_LIM changing with the switching frequency fs in accordance with an embodiment of the present invention.

In accordance with an embodiment of the present invention, the control module 103 may further comprise a current limit circuit 202. The current limit circuit 202 may be configured to compare the second feedback signal VCS with the current limit threshold VCS_LIM to generate the off-control signal OFFCTL, wherein the off-control signal OFFCTL is configured to trigger the driving signal DRV to turn the main switch 101 off when the second feedback signal VCS reaches the current limit threshold VCS_LIM. The second feedback signal VCS may be obtained by sensing the current flowing through the main switch 101. Turn back to FIG. 1, an exemplary current sensing circuit comprising a first sensing resistor RS1 and a second sensing resistor RS2 is illustrated. The first sensing resistor RS1 is coupled between the second switch terminal of the main switch 101 and the reference ground GND. The second sensing resistor RS2 is coupled between the second control input terminal CS of the control module 103 and the second switch terminal of the main switch 101. The current limit circuit 202 may further be configured to adjust the current limit peak Ipk based on the switching frequency fs in the constant voltage mode. For instance, this may be realized by adjusting the current limit threshold VCS_LIM. FIG. 3 illustrates a waveform diagram showing the current limit threshold VCS_LIM changing with the switching frequency fs. When the switching frequency fs is higher than (including equal to) a first predetermined frequency f1, the current limit circuit 202 is configured to set and maintain the current limit threshold VCS_LIM to a maximum threshold value VIpk-max (in correspondence, the current limit peak Ipk can be maintained at a maximum current limit peak value Ipk-max). When the switching frequency fs is decreased gradually from the first predetermined frequency f1 to a second predetermined frequency f2, the current limit circuit 202 is configured to decrease the current limit threshold VCS_LIM from the maximum threshold value VIpk-max to a minimum threshold value VIpk-min in response to the decreasing of the switching frequency fs (in correspondence, the current limit peak Ipk can be gradually decreased from the maximum current limit peak value Ipk-max to a minimum current limit peak value Ipk-min in response to the decreasing of the switching frequency fs). When the switching frequency fs is lower than (including equal to) the second predetermined frequency f2 and higher than a minimum allowable frequency fmin, the current limit circuit 202 is configured to set and maintain the current limit threshold VCS_LIM to the minimum threshold value VIpk-min (in correspondence, the current limit peak Ipk can be maintained at the minimum current limit peak value Ipk-min). In this fashion, the current limit circuit 202 and the control module 103 comprising the current limit circuit 202 may be able to adjust the current limit peak Ipk (i.e. the maximum allowable peak current value of the current flowing through the main switch 101) to decrease with the decrease in the switching frequency fs, e.g. the current limit peak Ipk can be gradually decreased from the maximum current limit peak value Ipk-max to a minimum current limit peak value Ipk-min in response to the decreasing of the switching frequency fs. In this way, when the power converter 100 enters into sleep mode (standby mode), with the decreasing in the switching frequency fs, the maximum current allowed to flow through the main switch 101 is also decreased. Therefore, the power dissipation of the power converter 100 is further reduced compared to conventional flyback converters and thus can meet the requirements of low standby power dissipation and low noise for most offline applications.

Continuing with FIG. 2, in accordance with an embodiment of the present invention, the control module 103 may further comprise a constant current mode control circuit 203. The constant current mode control circuit 203 is configured to regulate the charging and discharging of a constant current control capacitor 2032 based on a time feedback signal $St_{ons}$ which is indicative of an on time tons of the second switch 102 so as to regulate a ratio of the on-time tons of the second switch 102 to an off time toffs of the second switch 102 (in the following this ratio is referred to as on/off time ratio) to a predetermined on/off time ratio Ds. The predetermined on/off time ratio Ds may be chosen according to the requirement to the output voltage Vo under different application environments. In accordance with an embodiment of the present invention, the constant current mode control circuit 203 may be configured to compare a capacitor voltage VC across the constant current control capacitor 2032 with a predetermined voltage threshold Vth to provide a constant current mode ON control signal CC_ON so as to maintain the on/off time ratio of the second switch 102 to the predetermined on/off time ratio Ds. When the capacitor voltage VC across the constant current control capacitor 2032 is higher than the predetermined voltage threshold Vth, the constant current mode ON control signal CC_ON is configured to trigger the driving signal DRV to turn the main switch 101 on. The constant current mode control circuit 203 is further configured to receive the off-control signal OFFCTL, wherein the off-control signal OFFCTL is configured to trigger the driving signal DRV to turn the main switch 101 off when the current flowing through the main switch 101 reaches the current limit peak Ipk. The second switch 102 is turned on and off in complementary with the main switch 101. In this manner, the constant current mode control circuit 203 can regulate the power converter 100 to operate in constant current mode wherein the output current of the power converter 100 is maintained substantially constant through controlling the main switch 101 and the second switch 102 to switch on and off periodically.

In accordance with an embodiment of the present invention, in the constant current mode, the current limit circuit 202 may further be configured to maintain the current limit threshold VCS_LIM at the maximum threshold value VIpk-max. In this situation, the relationship between the output current Io and a peak current value Ipks of the current flowing through the second switch 102 may be expressed as:

$$Io = \frac{1}{2} I_{pks} \frac{t_{ons}}{t_{ons} + t_{offs}} = \frac{1}{2} I_{pks} Ds \quad (1)$$

When the second switch 102 is turned on, the peak current value Ipks of the current flowing through the second switch 102 may be expressed as:

$$I_{pks} = \frac{N_1}{N_2} I_{pk} \quad (2)$$

In the above expression (2), $N_1$ and $N_2$ respectively represent the number of turns of the primary winding N1 and the secondary winding N2. Substitute the peak current value Ipks in the expression (1) with the expression (2), it arrives at the following expression (3):

$$Io = \frac{1}{2} \frac{N_1}{N_2} I_{pk} Ds \quad (3)$$

In the constant current mode, since the current limit threshold VCS_LIM (which is indicative of the current limit peak Ipk) is maintained to the maximum threshold value VIpk-max, the current limit peak Ipk is thus maintained constant. Therefore, it can be concluded from the expression (3) that the output current Io can be maintained constant.

The constant voltage mode control circuit 201, the current limit circuit 202 and the constant current mode control circuit 203 will be described in more detail with reference to FIG. 2.

In accordance with an embodiment of the present invention, the constant voltage mode control circuit 201 may comprise a constant voltage mode control amplifier 2011, a first comparator (i.e. a constant voltage mode control comparator) 2012 and a first flip-flop 2013. The constant voltage mode control amplifier 2011 is configured to receive the first feedback signal Vfb at a first amplifier input terminal (e.g. the "−" input terminal illustrated in FIG. 2), to receive the reference signal Vref at a second amplifier input terminal (e.g. the "+" input terminal illustrated in FIG. 2), and to operate the first feedback signal Vfb with the reference signal Vref to provide the difference signal Vcomp at an amplifier output terminal. The first comparator 2012 may be configured to receive the difference signal Vcomp at a first comparator input terminal (the "−" input terminal in FIG. 2), to receive the saw tooth signal Vsaw at a second comparator input terminal (the "+" input terminal in FIG. 2), and to compare the difference signal Vcomp with the saw tooth signal Vsaw to provide the constant voltage mode ON control signal CV_ON at a comparator output terminal. The first flip-flop 2013 is configured to receive the constant voltage mode ON control signal CV_ON at a reset input terminal R, to receive the off-control signal OFFCTL from the current limit circuit 202 at a set input terminal S, and to provide a constant voltage control signal CVCTL at an output terminal Q.

In accordance with an embodiment of the present invention, the constant voltage mode control circuit 201 may further comprise a saw tooth signal generator 2014 which is configured to generate the saw tooth signal Vsaw and to reset the saw tooth signal Vsaw when the main switch 101 is turned off. For instance, the saw tooth signal generator 2014 may have a reset input terminal configured to receive a reset signal Rst. In an embodiment, the reset signal Rst may adopt the driving signal DRV. In an alternative embodiment, the reset signal Rst may adopt an "OR" of the driving signal DRV with the time feedback signal $St_{ons}$ which is indicative of the on time tons of the second switch 102.

In accordance with an embodiment of the present invention, the constant voltage mode control circuit 201 may further comprise a sample-hold (S&H) circuit 2015. The sample-hold circuit 2015 may have an input terminal coupled to the first control input terminal FB of the control module 103 to sample the first feedback signal Vfb provided to the feedback pin FB by the feedback circuit of the power converter 100. The sample-hold circuit 2015 is further configured to hold the sampled first feedback signal Vfb and provide the sampled and held first feedback signal Vfb to the first amplifier input terminal of the constant voltage mode control amplifier 2011.

In accordance with an embodiment of the present invention, the current limit circuit 202 may comprise a second comparator (i.e. a current limit comparator) 2021. The second comparator 2021 may have a first comparator input terminal (e.g. the "+" input terminal in FIG. 2), a second comparator input terminal (e.g. the "−" input terminal in FIG. 2) and a comparator output terminal, wherein the first comparator input terminal is configured to receive the second feedback signal VCS, the second comparator input terminal is configured to receive the current limit threshold VCS_LIM, and wherein the second comparator 2021 is configured to compare the second feedback signal VCS with the current limit threshold VCS_LIM to provide the off-control signal OFFCTL at the comparator output terminal, and wherein the off-control signal OFFCTL is configured to trigger the driving signal DRV to turn the main switch 101 off when the second feedback signal reaches the current limit threshold VCS_LIM.

In accordance with an embodiment of the present invention, the current limit circuit 202 may further comprise a current limit peak (Ipk) regulation circuit 2022. The current limit peak regulation circuit 2022 is configured to adjust the current limit peak Ipk based on the switching frequency fs in the constant voltage mode, i.e. to make the current limit peak Ipk be modulated by the switching frequency fs. In accordance with an embodiment of the present invention, the current limit peak regulation circuit 2022 is configured to modulate the current limit threshold VCS_LIM by the switching frequency fs so that the current limit peak Ipk is modulated by the switching frequency fs. The current limit peak regulation circuit 2022 may have a first regulation input terminal, a second regulation input terminal, a third regulation input terminal and a regulation output terminal, wherein the first regulation input terminal is configured to receive a frequency indication signal F(fs) indicative of the switching frequency fs, the second regulation input terminal is configured to receive a first reference signal Vref_f1 indicative of the first predetermined frequency f1 and the third regulation input terminal is configured to receive a second reference signal Vref_f2 indicative of the second predetermined frequency f2. The current limit peak regulation circuit 2022 may be configured to provide the current limit threshold VCS_LIM at the regulation output terminal based on the frequency indication signal F(fs), the first reference signal Vref_f1 and the second reference signal Vref_f2 so that the current limit threshold VCS_LIM is modulated by the switching frequency fs in the way that when the switching frequency fs is equal to or higher than the first predetermined frequency f1, the current limit threshold VCS_LIM is set and maintained to the maximum threshold value VIpk-max; when the switching frequency fs is decreased gradually from the first predetermined frequency f1 to the second predetermined frequency f2, the current limit threshold VCS_LIM is decreased from the maximum threshold value VIpk-max to the minimum threshold value VIpk-min in accordance with the decreasing of the switching frequency fs; when the switching frequency fs is equal to or lower than the second predetermined frequency f2 and higher than the minimum allowable frequency fmin, the current limit threshold VCS_LIM is maintained to the minimum threshold value VIpk-min. In accordance with an embodiment, the difference signal Vcomp may be used as the frequency indication signal F(fs) and provided to the first regulation input terminal of the current limit peak regulation circuit 2022 since the switching frequency fs of the power converter 100 can be determined by the difference signal Vcomp as set forth previously.

Figure 4:
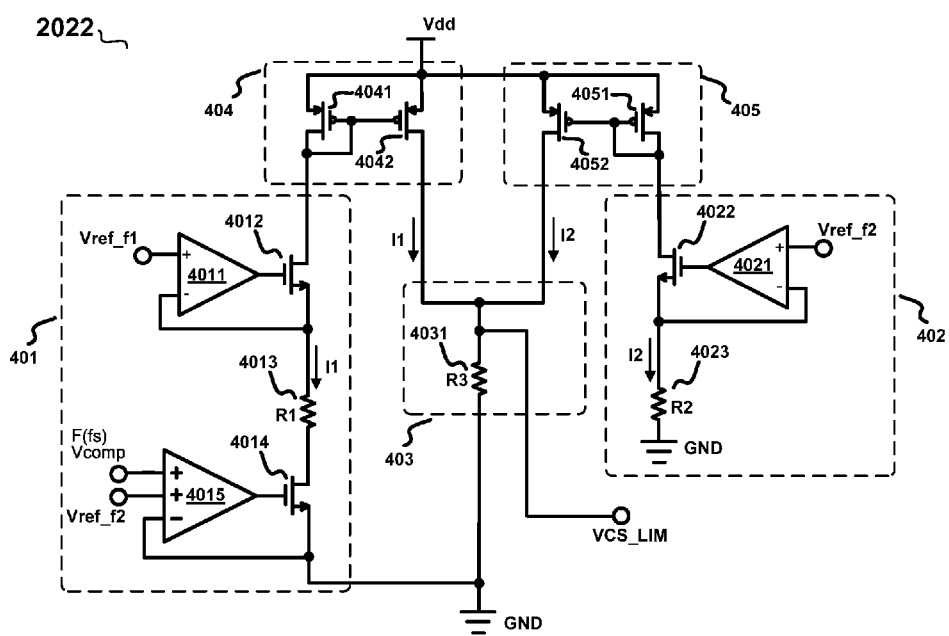
FIG. 4 illustrates a schematic diagram of a current limit peak regulation circuit 2022 that can be used in the power converter 100 in accordance with an embodiment of the present invention.

FIG. 4 illustrates a schematic diagram of a current limit peak regulation circuit 2022 that can be used in the power converter 100 in accordance with an embodiment of the present invention. In the example of FIG. 4, the current limit peak regulation circuit 2022 may comprise a first current setting circuit 401, a second current setting circuit 402 and a current superposing and conversion circuit 403. In an exemplary embodiment, the current limit peak regulation circuit 2022 may further comprise a first current mirror 404 and a second current mirror 405.

The first current setting circuit 401 is configured to respectively receive the frequency indication signal F(fs) (e.g. the difference signal Vcomp), the first reference signal Vref_f1 and the second reference signal Vref_f2, and to generate a first current I1 based on the frequency indication signal F(fs), the first reference signal Vref_f1 and the second reference signal Vref_f2, wherein the first current I1 is zero when the frequency indication signal F(fs) is equal to or higher than the second reference signal Vref_f2, and wherein the first current I1 is proportional to a difference between the second reference signal Vref_f2 and the frequency indication signal F(fs) (i.e. Vref_f2−F(fs)) with a first coefficient K1 when the frequency indication signal F(fs) is higher than the first reference signal Vref_f1 and lower than the second reference signal Vref_f2, and wherein the first current I1 is proportional to a difference between the second reference signal Vref_f2 and the first reference signal Vref_f1 (i.e. Vref_f2−Vref_f1) with the first coefficient K1 when the frequency indication signal F(fs) is equal to or lower than the first reference signal Vref_f1. That is to say, the first current I1 may be expressed by the following expression (4):

$$I1 = \begin{cases} 0 & Vcomp \geq Vref\_f2 \\ K1*(Vref\_f2 - F(fs)) & Vref\_f1 \leq Vcomp < Vref\_f2 \\ K1*(Vref\_f2 - Vref\_f1) & Vcomp \leq Vref\_f1 \end{cases} \quad (4)$$

In the above expression (4), the first coefficient K1 may appropriately be chosen according to practical application requirements. For instance, in an embodiment, the first coefficient K1 may be the reciprocal of a first resistance value R1 of a first resistive device, i.e. K1=1/R1.

In an embodiment, the first current setting circuit 401 may comprise a first operational amplifier 4011, a first transistor 4012, a first resistive device 4013 having a first resistive value R1, a second transistor 4014 and a second operational amplifier 4015. The first operational amplifier 4011 may have a first input terminal (e.g. the "+" input terminal illustrated in FIG. 4) configured to receive the first reference signal Vref_f1, a second input terminal (e.g. the "−" input terminal illustrated in FIG. 4) coupled to a first terminal of the first transistor 4012, and an output terminal coupled to a control terminal of the first transistor 4012. The first transistor 4012 is configured to provide the first current I1 at a second terminal of the first transistor 4012. The first resistive device 4013 may have a first terminal and a second terminal, wherein the first terminal is coupled to the first terminal of the first transistor 4012 and the second terminal is coupled to a first terminal of the second transistor 4014. A second terminal of the second transistor 4014 is connected to the reference ground GND. The second operational amplifier 4015 may have a first input terminal (e.g. the "+" input terminal illustrated in FIG. 4) configured to receive the frequency indication signal F(fs) (e.g. the difference signal Vcomp), a second input terminal (e.g. another "+" input terminal illustrated in FIG. 4) configured to receive the second reference signal Vref_f2, a third input terminal (e.g. the "−" input terminal illustrated in FIG. 4) coupled to the second terminal of the second transistor 4014 and an output terminal coupled to the control terminal of the second transistor 4014. In an embodiment, the first transistor 4011 and the second transistor 4014 may be N channel transistors. It should be understood that the circuit elements and configuration of the first current setting circuit 401 illustrated in FIG. 4 are only illustrative and not intended to be limiting.

The second current setting circuit 402 is configured to receive the second reference signal Vref_f2 and to generate a second current I2 based on the second reference signal Vref_f2, wherein the second current I2 is proportional to the second reference signal Vref_f2 with a second coefficient K2. That is to say, the second current I2 may be expressed by the following expression (5):

$$I2 = K2 * Vref\_f2 \quad (5)$$

In the above expression (5), the second coefficient K2 may be appropriately chosen according to practical application requirements. For instance, in an embodiment, the second coefficient K2 may be the reciprocal of a resistance value R2 of a second resistive device, i.e. K2=1/R2.

In an embodiment, the second current setting circuit 402 may comprise a third operational amplifier 4021, a third transistor 4022 and a second resistive device 4023 having a second resistance value R2. The third operational amplifier 4021 may have a first input terminal (e.g. the "+" input terminal illustrated in FIG. 4) configured to receive the second reference signal Vref_f2, a second input terminal (e.g. the "−" input terminal illustrated in FIG. 4) coupled to a first terminal of the third transistor 4022, and an output terminal coupled to a control terminal of the third transistor 4022. The third transistor 4022 is configured to provide the second current I2 at a second terminal of the third transistor 4022. The second resistive device 4023 may have a first terminal and a second terminal, wherein the first terminal is coupled to the first terminal of the third transistor 4022 and the second terminal is connected to the reference ground GND. It should be understood that the circuit elements and configuration of the second current setting circuit 402 illustrated in FIG. 4 are only illustrative and not intended to be limiting.

In an embodiment, the first current mirror 404 may be configured to receive the first current I1 at a first mirror input terminal and to mirror/copy the first current I1 to output the mirrored first current I1 at a first mirror output terminal. In the example of FIG. 4, the first current mirror 404 is illustrated as to comprise a fourth transistor 4041 and a fifth transistor 4042, each having a first terminal, a second terminal and a control terminal. Both the first terminal of the fourth transistor 4041 and the first terminal of the fifth transistor 4042 are coupled to an internal voltage Vdd provided by other internal module of the power converter 100. The internal voltage Vdd may be steady and have a relatively low level (e.g. 5V or 3V etc.), which is more suitable for powering low-voltage internal devices of the power converter 100. The control terminal of the fourth transistor 4041 is coupled to the second terminal of the fourth transistor 4041 and the control terminal of the fifth transistor 4042. The second terminal of the fourth transistor 4041 is configured as the first mirror input terminal of the first current mirror 404 to receive the first current I1. The second terminal of the fifth transistor 4042 is configured as the first mirror output terminal to provide the mirrored first current I1.

In an embodiment, the second current mirror 405 may be configured to receive the second current I2 at a second mirror input terminal and to mirror/copy the second current I2 to output the mirrored second current I2 at a second mirror output terminal. In the example of FIG. 4, the second current mirror 405 is illustrated as to comprise a sixth transistor 4051 and a seventh transistor 4052, each having a first terminal, a second terminal and a control terminal. Both the first terminal of the sixth transistor 4051 and the first terminal of the seventh transistor 4052 are coupled to the internal voltage Vdd. The control terminal of the sixth transistor 4051 is coupled to the second terminal of the sixth transistor 4051 and the control terminal of the seventh transistor 4052. The second terminal of the sixth transistor 4051 is configured as the second mirror input terminal of the second current mirror 405 to receive the second current I2. The second terminal of the seventh transistor 4052 is configured as the second mirror output terminal to provide the mirrored second current I2.

In an embodiment, the current superposing and conversion circuit 403 may be configured to receive the first current I1 (or the mirrored first current I1 as shown in FIG. 4) and the second current I2 (or the mirrored second current I2 as shown in FIG. 4) respectively at a first input terminal and a second input terminal, to superpose the first current I1 and the second current I2 to generate a superposing current, and to convert the superposing current to the current limit threshold VCS_LIM with a third coefficient K3. That is to say, the current limit threshold VCS_LIM may be expressed as:

$$I_{pks} = \frac{N_1}{N_2} I_{pk} \tag{6}$$

In the above expression (6), the third coefficient K3 may be appropriately chosen according to practical application requirements. For instance, in an embodiment, the third coefficient K3 may be set to a third resistance value R3 of a third resistive device, i.e. K3=R3. In an embodiment, the current superposing and conversion circuit 403 may simply comprise a third resistive device 4031 having a first terminal coupled to both the first input terminal and the second input terminal of the current superposing and conversion circuit 403, and a second terminal connected to the reference ground GND. In this way, the first terminal of the third resistive device 4031 receives both the first current I1 and the second current I2 and thus realizes the superposing of the first current I1 and the second current I2 to generate the superposing current. This superposing current then flows through the third resistive device 4031 and is converted to a voltage signal (i.e. the current limit threshold VCS_LIM). The first terminal of the third resistive device 4031 is also used as the output terminal of the current superposing and conversion circuit 403 to provide the current limit threshold VCS_LIM. It should be understood by those of ordinary skill in the art that the current superposing and conversion circuit 403 is not limited to this example but may comprise other components/circuits such as a current to voltage conversion circuit. Combining the expressions (4), (5) and (6), it can be deduced that the current limit threshold VCS_LIM can be expressed by the following expression (7).

$$\text{VCS\_LIM} = \begin{cases} VIpk-\min = K3*K2*\text{Vref\_f2} & Vcomp \geq \text{Vref\_f2} \\ K3*K1*(\text{Vref\_f2} - Vcomp) + K3*K2*\text{Vref\_f2} & \text{Vref\_f1} \leq Vcomp < \text{Vref\_f2} \\ VIpk-\max = K3*K1*(\text{Vref\_f2} - \text{Vref\_f1}) + K3*K2*\text{Vref\_f2} & Vcomp \leq \text{Vref\_f1} \end{cases} \tag{7}$$

From the above expression (7), it can be concluded that the maximum threshold value VIpk-max is equal to the product (K1*K3) of the first coefficient K1 and the third coefficient K3 multiplying the difference (Vref_f2−Vref_f1) between the second reference signal Vref_f2 and the first reference signal Vref_f1 plus the second reference signal Vref_f2 multiplying the product (K2*K3) of the second coefficient K2 and the third coefficient K3. The minimum threshold value VIpk-min is equal to the second reference signal Vref_f2 multiplying the product (K2*K3) of the second coefficient K2 and the third coefficient K3. During the switching frequency fs decreasing from the first predetermined frequency f1 to the second predetermined frequency f2, the current limit threshold VCS_LIM is equal to the product (K1*K3) of the first coefficient K1 and the third coefficient K3 multiplying the difference (Vref_f2−F(fs)) between the second reference signal Vref_f2 and the frequency indication signal F(fs) plus the second reference signal Vref_f2 multiplying the product (K2*K3) of the second coefficient K2 and the third coefficient K3. In the example of the above expression (7), the frequency indication signal F(fs) is set to be the difference signal Vcomp. It can be seen from the expression (7) that the current limit threshold VCS_LIM may be set in an appropriate range, for instance, higher than or equal to the minimum threshold value VIpk-min and lower than or equal to the maximum threshold value VIpk-max, by appropriately choosing the first reference signal Vref_f1, the second reference signal Vref_f2, the first coefficient K1, the second coefficient K2 and the third coefficient K3. The current limit threshold VCS_LIM may be controlled to decrease with the switching frequency fs (indicated by the difference signal Vcomp) decreasing from the first predetermined frequency f1 (indicated by the first reference signal Vref_f1) to the second predetermined frequency f2 (indicated by the second reference signal Vref_f2). Correspondingly, the current limit regulation circuit 2022 and the current limit circuit 202 can adjust the current limit peak Ipk (i.e. the maximum allowable peak current value of the current flowing through the main switch 101) to decrease with the decreasing in the switching frequency fs. Therefore, when the power converter 100 enters into sleep mode (standby mode), with the decreasing in the switching frequency fs, the maximum current allowed to flow through the main switch 101 is also decreased and the power dissipation of the power converter 100 is consequently reduced compared to conventional flyback converters. Thus, the power converter 100 in accordance with various embodiments of the present invention can meet the requirements of low standby power dissipation and low noise for most offline applications.

In the above expression (7), should the first coefficient K1, the second coefficient K2 and the third coefficient K3 are respectively set to be the reciprocal of the first resistance value R1 of the first resistive device 4013, the reciprocal of the second resistance value R2 of the second resistive device 4023 and the third resistance value R3 of the third resistive device 403, it can be deduced that:

$$VCS\_LIM = \begin{cases} VIpk - \min = \dfrac{Vref\_f2 * R3}{R2} & Vcomp \geq Vref\_f2 \\ \dfrac{(R1+R2)*Vref\_f2 - R2*Vcomp}{R1*R2} * R3 & Vref\_f1 \leq Vcomp < Vref\_f2 \\ VIpk - \max = \dfrac{(R1+R2)*Vref\_f2 - R2*Vref\_f1}{R1*R2} * R3 & Vcomp \leq Vref\_f1 \end{cases} \quad (8)$$

In accordance with an embodiment of the present invention, turning back to FIG. 2, the current limit circuit 202 may further comprise a maximum on time limit circuit 2023 coupled between the output terminal of the second comparator 2021 and the output terminal of the current limit circuit 202 and configured to regulate the off-control signal OFFCTL so as to limit the maximum on time of the main switch to be a predetermined on time $t_{ONmax}$. When the on time of the main switch 101 reaches the predetermined on time $t_{ONmax}$, the power converter 100 enters into protection mode so as to prevent faults caused by short of the current sensing circuit etc.

In accordance with an embodiment of the present invention, still referring to FIG. 2, the current limit circuit 202 may further comprise a leading edge blanking circuit 2024. The leading edge blanking circuit 2024 may have an input terminal coupled to the second control input terminal CS to receive a current sensing signal from the current sensing circuit and be configured to blank the leading edge of the current sensing signal to provide the leading edge blanked current sensing signal as the second feedback signal VCS to the first input terminal of the second comparator 2021. The leading edge blanking circuit 2024 may help in preventing false trigger to the current limit circuit 202 due to spikes at the leading edge of the current sensing signal.

Still refer to FIG. 2, the constant current mode control circuit 203 will be described in more detail in the following. In accordance with an embodiment of the present invention, the constant current mode control circuit 203 may comprise a third comparator (i.e. a constant current control comparator) 2031, a constant current control capacitor 2032, a first controllable current source, a second controllable current source and a second flip-flop 2033. The third comparator 2031 may be configured to receive the capacitor voltage VC across the constant current control capacitor 2032 at a first comparator input terminal (the "+" input terminal in FIG. 2), to receive the predetermined voltage threshold Vth at a second comparator input terminal (the "−" input terminal in FIG. 2), and to compare the capacitor voltage VC with the predetermined voltage threshold Vth to provide the constant current mode ON control signal CC_ON at a comparator output terminal. The first controllable current source is configured to provide a charging current $I_{tons}$ to charge the constant current control capacitor 2032 during the off time toffs of the second switch 102 based on the time feedback signal $St_{ons}$ which is indicative of the on time tons of the second switch 102. In an embodiment, the first controllable current source may comprise a first current source 2034 and a first switching device 2035. The first current source 2034 is coupled between the internal voltage Vdd and a first terminal of the first switching device 2035, and is configured to provide the charging current $I_{tons}$. A second terminal of the first switching device 2035 is coupled to a first capacitor terminal of the constant current control capacitor 2032, and a control terminal of the first switching device 2035 is configured to receive an inverted signal of the time feedback signal $St_{ons}$. In an embodiment, the time feedback signal $St_{ons}$ is sent to an inverter 2038 to generate the inverted signal. The second controllable current source is configured to provide a discharging current $I_{toffs}$ to discharge the constant current control capacitor 2032 during the on time tons of the second switch 102 based on the time feedback signal $St_{ons}$. In an embodiment, the second controllable current source may comprise a second current source 2036 and a second switching device 2037. The second current source 2036 is coupled between the first capacitor terminal of the constant current control capacitor 2032 and a first terminal of the second switching device 2037, and is configured to provide the discharging current $I_{toffs}$. A second terminal of the second switching device 2037 is coupled to the reference ground GND, and a control terminal of the second switching device 2037 is configured to receive the time feedback signal $St_{ons}$. The second flip-flop 2033 is configured to receive the constant current mode ON control signal CC_ON at a reset input terminal R, to receive the off-control signal OFFCTL from the current limit circuit 202 at a set input terminal S, and to provide a constant current control signal CCCTL.

In accordance with an embodiment of the present invention, the control module 103 may further comprise a logic control circuit 204 configured to receive the constant voltage control signal CVCTL and the constant current control signal CCCTL, and to generate the driving signal DRV based on the constant voltage control signal CVCTL and the constant current control signal CCCTL.

One of ordinary skill in the art should understand that the current limit peak regulation circuit 2022, the current limit circuit 202, the control module 103 and the power converter 100 according to the embodiments described with reference to FIGS. 1-4 are illustrative and non-exclusive. Various modifications may be made without departing from the spirit of the present invention. Many of the elements of one embodiment may be combined with other embodiments in addition to or in lieu of the elements of the other embodiments. Accordingly, the present invention is not limited except as by the appended claims. The advantages of the various embodiments of the present invention are not confined to those described above. These and other advantages of the various embodiments of the present invention will become more apparent upon reading the whole detailed descriptions and studying the various figures of the drawings.

What is claimed is:

1. A current limit peak regulation circuit for regulating a current flowing through a main switch of a power converter, comprising:
    a first input terminal configured to receive a frequency indication signal indicative of a switching frequency of the power converter;
    a second input terminal configured to receive a first reference signal indicative of a first predetermined frequency;
    a third input terminal configured to receive a second reference signal indicative of a second predetermined frequency; and
    an output terminal configured to provide a current limit threshold indicative of a maximum allowable peak current value of the current flowing through the main switch; wherein
    the current limit peak regulation circuit is configured to generate the current limit threshold based on the frequency indication signal, the first reference signal and the second reference signal; and wherein
    the current limit peak regulation circuit is further configured to adjust the current limit threshold to decrease with decrease in the switching frequency in a constant voltage mode of the power converter.

2. The current limit peak regulation circuit of claim 1, wherein the current limit peak regulation circuit is further configured to set and maintain the current limit threshold to a maximum threshold value when the switching frequency is higher than or equal to a first predetermined frequency, to decrease the current limit threshold from the maximum threshold value to a minimum threshold value when the switching frequency is decreased gradually from the first predetermined frequency to a second predetermined frequency, and to set and maintain the current limit threshold to the minimum threshold value when the switching frequency is lower than or equal to the second predetermined frequency and higher than a minimum allowable frequency.

3. The current limit peak regulation circuit of claim 2, further comprising:
    a first current setting circuit, configured to respectively receive the frequency indication signal, the first reference signal and the second reference signal, and to generate a first current based on the frequency indication signal, the first reference signal and the second reference signal, wherein the first current is zero when the frequency indication signal is equal to or higher than the second reference signal, and wherein the first current is proportional to a difference between the second reference signal and the frequency indication signal with a first coefficient when the frequency indication signal is higher than the first reference signal and lower than the second reference signal, and wherein the first current is proportional to a difference between the second reference signal and the first reference signal with the first coefficient when the frequency indication signal is equal to or lower than the first reference signal;
    a second current setting circuit, configured to receive the second reference signal and to generate a second current based on the second reference signal, wherein the second current is proportional to the second reference signal with a second coefficient; and
    a current superposing and conversion circuit, configured to respectively receive the first current and the second current, to superpose the first current with the second current to generate a superposing current, and to convert the superposing current to the current limit threshold with a third coefficient.

4. The current limit peak regulation circuit of claim 3, wherein:
    the maximum threshold value is equal to the product of the first coefficient and the third coefficient multiplying the difference between the second reference signal and the first reference signal plus the second reference signal multiplying the product of the second coefficient and the third coefficient; and wherein
    the minimum threshold value is equal to the second reference signal multiplying the product of the second coefficient and the third coefficient; and wherein
    during the switching frequency decreasing from the first predetermined frequency to the second predetermined frequency, the current limit threshold is equal to the product of the first coefficient and the third coefficient multiplying the difference between the second reference signal and the frequency indication signal plus the second reference signal multiplying the product of the second coefficient and the third coefficient.

5. The current limit peak regulation circuit of claim 3, wherein the first current setting circuit comprises:
    a first operational amplifier having a first input terminal configured to receive the first reference signal, a second input terminal and an output terminal;
    a first transistor having a first terminal coupled to the second input terminal of the first operational amplifier, a second terminal configured to provide the first current and a control terminal coupled to the output terminal of the first operational amplifier;
    a first resistive device having a first terminal coupled to the first terminal of the first transistor, and a second terminal;
    a second transistor having a first terminal coupled to the second terminal of the first resistive device, a second terminal connected to the reference ground, and a control terminal; and
    a second operational amplifier having a first input terminal configured to receive the frequency indication signal, a second input terminal configured to receive the second reference signal, a third input terminal coupled to the second terminal of the second transistor, and an output terminal coupled to the control terminal of the second transistor.

6. The current limit peak regulation circuit of claim 3, wherein the second current setting circuit comprises:
   a third operational amplifier having a first input terminal configured to receive the second reference signal, a second input terminal and an output terminal;
   a third transistor having a first terminal coupled to the second terminal of the third operational amplifier, a second terminal configured to provide the second current, and a control terminal coupled to the output terminal of the third operational amplifier; and
   a second resistive device having a first terminal coupled to the first terminal of the third transistor, and a second terminal connected to the reference ground.

7. The current limit peak regulation circuit of claim 3, wherein the current superposing and conversion circuit comprises:
   a third resistive device having a first terminal configured to receive both the first current and the second current to superpose the first current with the second current, and a second terminal connected to the reference ground, wherein the first terminal of the third resistive device is further led out to provide the current limit threshold.

8. The current limit peak regulation circuit of claim 3, further comprising:
   a first current mirror configured to receive the first current at a first mirror input terminal and to mirror the first current to output the mirrored first current at a first mirror output terminal; and
   a second current mirror configured to receive the second current at a second mirror input terminal and to mirror the second current to output the mirrored second current at a second mirror output terminal; wherein
   the current superposing and conversion circuit is configured to respectively receive the mirrored first current and the mirrored second current instead of the first current and the second current, and to superpose the mirrored first current with the mirrored second current to generate the superposing current.

9. The current limit peak regulation circuit of claim 1, wherein the frequency indication signal comprises a difference signal indicative of a difference between an output voltage feedback signal indicative of an output voltage of the power converter and a reference signal indicative of a desired value of the output voltage.

10. A current limit circuit for a power converter, comprising:
    a current limit peak regulation circuit configured to respectively receive a frequency indication signal indicative of a switching frequency of the power converter, a first reference signal indicative of a first predetermined frequency and a second reference signal indicative of a second predetermined frequency, to generate a current limit threshold indicative of a maximum allowable peak current value of a current flowing through a main switch of the power converter based on the frequency indication signal, the first reference signal and the second reference signal, and to adjust the current limit threshold to decrease with decrease in the switching frequency in a constant voltage mode of the power converter; and
    a current limit comparator configured to respectively receive the current limit threshold and a switch current feedback signal indicative of a current flowing through a main switch of the power converter, and to compare the switch current feedback signal with the current limit threshold to provide an off-control signal at an output terminal, wherein the off-control signal is configured to turn the main switch off when the switch current feedback signal reaches the current limit threshold.

11. The current limit circuit of claim 10, further comprising:
    a maximum on time limit circuit coupled between the output terminal of the current limit comparator and an output terminal of the current limit circuit, and configured to regulate the off-control signal to limit a maximum on time of the main switch to be a predetermined on time.

12. A control module for a power converter comprising the current limit circuit of claim 10, and further comprising:
    a constant voltage mode control circuit configured to operate an output voltage feedback signal indicative of an output voltage of the power converter with a reference signal indicative of a desired value of the output voltage to provide a difference signal indicative of a difference between the output voltage feedback signal and the reference signal, to compare the difference signal with a saw tooth signal to provide a constant voltage mode ON control signal to turn the main switch on when the saw tooth signal reaches the difference signal, and to receive the off-control signal to turn the main switch off.

13. The control module of claim 12, wherein the constant voltage mode control circuit comprises:
    a constant voltage mode control amplifier configured to receive the output voltage feedback signal at a first amplifier input terminal, to receive the reference signal at a second amplifier input terminal, and to operate the output voltage feedback signal with the reference signal to provide the difference signal at an amplifier output terminal;
    a constant voltage mode control comparator configured to receive the difference signal at a first comparator input terminal, to receive the saw tooth signal at a second comparator input terminal, and to compare the difference signal with the saw tooth signal to provide the constant voltage mode ON control signal at a comparator output terminal; and
    a first flip-flop configured to receive the constant voltage mode ON control signal at a reset input terminal, to receive the off-control signal at a set input terminal, and to provide a constant voltage control signal at an output terminal.

14. The control module of claim 13, wherein the constant voltage mode control circuit further comprises:
    a saw tooth signal generator configured to generate the saw tooth signal and to reset the saw tooth signal when the main switch is turned off.

15. The control module of claim 12, further comprising:
    a constant current mode control circuit configured to regulate charging and discharging of a constant current control capacitor based on a time feedback signal which is indicative of an on time of a second switch of the power converter, to compare a capacitor voltage across the constant current control capacitor with a predetermined voltage threshold to provide a constant current mode ON control signal which is configured to turn the main switch on when the capacitor voltage is higher than the predetermined voltage threshold, and to receive the off-control signal to turn the main switch off.

16. The control module of claim 15, wherein the constant current mode control circuit comprises:

the constant current control capacitor;

a constant current control comparator, configured to receive the capacitor voltage across the constant current control capacitor at a first comparator input terminal, to receive the predetermined voltage threshold at a second comparator input terminal, and to compare the capacitor voltage with the predetermined voltage threshold to provide the constant current mode ON control signal at a comparator output terminal;

a first controllable current source, configured to provide a charging current to charge the constant current control capacitor during an off time of the second switch based on the time feedback signal;

a second controllable current source, configured to provide a discharging current to discharge the constant current control capacitor during the on time of the second switch based on the time feedback signal; and a second flip-flop, configured to receive the constant current mode ON control signal at a reset input terminal, to receive the off-control signal from the current limit circuit at a set input terminal, and to provide a constant current control signal at an output terminal.

17. A power converter comprising:

an input port configured to receive an input voltage;

an output port configured to provide an output voltage;

a switch module at least comprising a main switch; and a control module configured to receive an output voltage feedback signal indicative of the output voltage and a switch current feedback signal indicative of a current flowing through the main switch, and to provide a driving signal to the switch module at least based on the output voltage feedback signal, the switch current feedback signal, a reference signal indicative of a desired value of the output voltage and a current limit threshold indicative of a maximum allowable peak current value of the current flowing through the main switch; wherein the control module comprises a current limit peak regulation circuit configured to generate the current limit threshold and to adjust the current limit threshold to decrease with decrease in the switching frequency in a constant voltage mode of the power converter.

* * * * *